United States Patent
Kuo et al.

(10) Patent No.: US 6,313,235 B1
(45) Date of Patent: Nov. 6, 2001

(54) METHOD FOR PREPARING POLYPROPYLENE TEREPHTHALATE/POLYETHYLENE TEREPHTALATE COPOLYESTER

(75) Inventors: Tung-Ying Kuo, Hsinchu; I-Min Tseng, Nantou; Jih-Chen Huang, Hsinchu; Wen-Chuan Shu, Hsien, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/556,631

(22) Filed: Apr. 21, 2000

(30) Foreign Application Priority Data

Dec. 31, 1999 (TW) .............................................. 088123384

(51) Int. Cl.⁷ .............................. C08F 20/00; C08G 63/78
(52) U.S. Cl. ......................... 525/444; 528/275; 528/277; 528/279; 528/280; 528/285; 528/302; 528/308; 528/308.6; 525/437; 524/777; 524/783; 524/785; 524/788
(58) Field of Search ..................................... 528/275, 277, 528/279, 280, 285, 302, 308, 308.6; 525/437, 444; 524/777, 783, 785, 788

(56) References Cited

U.S. PATENT DOCUMENTS 4,029,637 * 6/1977 Sikkema .
4,029,638 * 6/1977 McNeely .
4,049,633 * 9/1977 Penton, Jr. .
4,668,764 * 5/1987 Satou ................................. 528/308.1
5,599,900 * 2/1997 Bhatia .................................. 528/491

* cited by examiner

Primary Examiner—Samuel A. Acquah
(74) Attorney, Agent, or Firm—Sughrue, Mion, Zinn, Macpeak & Seas, PLLC

(57) ABSTRACT

The present invention provides a method for preparing polypropylene terephthalate/polyethylene terephthalate (PPT/PET) copolyester, which comprises a group of processes from (a) to (e). Process (a) comprises subjecting bis-2-hydroxyethyl terephthalate (BHET), pure terephthalic acid (PTA) and 1,3-propanediol (1,3-PDO) to undergo esterification reaction to produce BHET and bis-2-hydroxypropyl terephthalate (BHPT), and then subjecting BHET and BHPT to undergo copolymerization reaction. Process (b) comprises subjecting PTA and 1,3-PDO to undergo esterification reaction to produce BHPT, adding BHET, and then subjecting BHET and BHPT to undergo copolymerization reaction. Process (c) comprises subjecting BHET and BEPT to undergo copolymerization reaction. Process (d) comprises subjecting PTA, ethylene glycol (EG) and 1,3-PDO to undergo esterification reaction to produce BHET and BHPT, and then subjecting BHET and BHPT to undergo copolymerization reaction. Process (e) comprises subjecting BHPT, PTA and EG to undergo esterification reaction to produce BHPT and BHET, and then subjecting BHET and BHPT to undergo copolymerization reaction. The obtained preferred PPT/PET copolyester of the present invention has the following properties: intrinsic viscosity (IV)>0.6 dl/g, acid value (—COOH amount)<40 meq/kg, melting point=190° C.–250° C., L*>60, and b*<12. Therefore, the PPT/PET copolyester of the present invention is suitable for use as fiber and engineering plastic.

21 Claims, No Drawings

METHOD FOR PREPARING POLYPROPYLENE TEREPHTHALATE/POLYETHYLENE TEREPHTALATE COPOLYESTER

BACKGROUND OF THE INVENTION

1. Field of the Invention

The present invention relates to a method for preparing polypropylene terephthalate/polyethylene terephthalate copolyester (referred to as PPT/PET copolyester hereinafter), and more particularly the invention relates to a method for preparing PPT/PET copolyester by employing a process selected from between the process (a) and the process (e), whereas: process (a) involves reacting BHET, PTA and 1,3-PDO first by an esterification reaction and then by a copolymerization reaction; process (b) involves subjecting PTA and 1,3-PDO in undergoing an esterification reaction, adding BHET to the content, and then reacting the content by a copolymerization reaction; process (c) involves directly copolymerizing BHET and BHPT; process (d) involves reacting PTA, ethylene glycol (EG) and 1,3-PDO first by an esterification reaction and then by a copolymerization reaction; and process (e) involves reacting BHPT, PTA and EG first by an esterification reaction and then by a copolymerization reaction.

2. Description of the Prior Art

Generally speaking, polyethylene terephthalate (PET) is a material that has high strength and high modulus, but it is difficult to be dyed in rich colors. On the other hand, polypropylene terephthalate (PPT) is a material that can be easily dyed and has high elastic resilience, but its disadvantages are low strength and low melting point.

Therefore, many efforts have been made to improve on the dyeability of a fiber grade PET. As disclosed in U.S. Pat. No. 4,049,633 (1977), U.S. Pat. No. 4,029,637 (1977), U.S. Pat. No. 4,029,638 (1977), and U.S. Pat. No. 4,668,764 (1987), a dyeing auxiliary agent is added during the polymerization reaction to obtain a copolyester. The dyeing auxiliary agents commonly used include N,N,N',N'-tetramethyl-1,8-diaminonaphthalene, N-(β-hydroxyethyl)-N-(3-carbomethoxybenzesulfonyl)taurine, alkali metal salt of N-benzyl-N-propyl sulfonate benzene sulfonamide, 1,4-cyclohexanedimethanol, and 2,2-bis-propane. As mentioned above, the dyeability of the copolyester can be improved by the addition of the dyeing auxiliary agent, however, the processability will be decreased such that the whole process is adversely affected. For example, not only does the commercial cationic dyeable PET in fiber form has a lower strength than conventional polyester fiber, but it also has a shorter pack life during melt spinning than conventional polyester. In addition, the cationic dyeable PET has the disadvantage of not being able to be produced in continuous mode.

Thus, researchers have thought of copolymerizing PPT and PET together to form a new polyester with improved physical properties. Ponnusamy and Balakrishnan develop a PET/PPT copolyester, which is produced by reacting dimethyl terephthalate (DMT), ethylene glycol, and 1,3-propanediol in a melt-polycondensation reaction (*J. Macromol. Sci.-Chem.*, A22 (3), pp. 373–378 (1985)). Nonetheless, methanol by-product is difficult to be recovered while DMT has always been a very expensive compound. In addition, the PET/PPT copolyester obtained through the melt-polycondensation reaction has too small a molecular weight, and the maximum intrinsic viscosity is only 0.4 dL/g with no practical value.

On the other hand, Yang Ho Park et al. develop another PET/PPT copolyester, which is produced by reacting PET oligomer and 1,3-propanediol (1,3-PDO, also abbreviated as PG) in a polycondensation reaction (*Journal of the Korean Fiber Society*, Vol. 36, No. 7, 1999). The PET oligomer (BHET) reacts only with the end residual groups of the PG compound. Therefore, theoretically, the bis-2-hydroxypropyl terephthalate (BHPT) chain obtained in the copolyester product is very limited. In addition, the reaction temperature is between 240° C. and 280° C., which exceeds the boiling point of PG. In addition, the alcohol of the PET oligomer should be reacted with 1,3-propanediol by an interchange reaction and then by the polycondensation reaction to produce the PPT/PET copolyester. The ethylene glycol by-product formed during the interchange reaction must be removed, thus the production cost is adversely increased.

SUMMARY OF THE INVENTION

The object of the present invention is to solve the above-mentioned problems and to provide a method for preparing polypropylene terephthalate/polyethylene terephthalate (PPT/PET). The present invention employs inexpensive and commercially-available starting materials such as pure terephthalic acid (PTA), ethylene glycol (EG), and 1,3-propanediol (PDO); in addition, the reaction can be performed in a conventional PET reaction device or a conventional PPT reaction device. The obtained PPT/PET copolyester has the following properties: intrinsic viscosity (IV)>0.6 dl/g, acid value (—COOH amount)<40 meq/kg, melting point=190° C.–250° C., L*>60, and b*<12. According to a preferred embodiment of the present invention, the PPT/PET copolyester has a 5 wt % to a 7.5 wt % of BHPT chain, which is suitable for use as a fiber and engineering plastic.

To achieve the object of the present invention, the method for preparing polypropylene terephthalate/polyethylene terephthalate (PPT/PET) copolyester comprises using a process selected between the process (a) and the process (e), whereas:

process (a) comprises subjecting bis-2-hydroxyethyl terephthalate (BHET), pure terephthalic acid (PTA) and 1,3-propanediol (1,3-PDO) to undergo an esterification reaction to produce BHET and bis-2-hydroxypropyl terephthalate (BHPT), and then subjecting BHET and BHPT to undergo a copolymerization reaction;

process (b) comprises subjecting PTA and 1,3-PDO to undergo an esterification reaction to produce BHPT, adding BHET, and then subjecting BHET and BHPT to undergo a copolymerization reaction;

process (c) comprises subjecting BHET and BHPT to undergo a copolymerization reaction;

process (d) comprises subjecting PTA, ethylene glycol (EG) and 1,3-PDO to undergo an esterification reaction to produce BHET and BHPT, and then subjecting BHET and BHPT to undergo a copolymerization reaction; and process (e) comprises subjecting BHPT, PTA and EG to undergo an esterification reaction to produce BHPT and BHET, and then subjecting BHET and BHPT to undergo a copolymerization reaction.

DETAILED DESCRIPTION OF THE INVENTION

Compared with the conventional process for preparing fiber grade PET with improved dyeability, the present invention does not employ any dyeing auxiliary monomer, and the copolyester of the present invention contains PET molecular chain and PPT molecular chain which are connected to each other. In addition, conventional devices for producing polyester (such as PET or PPT) can be used in the present invention. The PPT/PET copolyester of the present invention has as good a dyeability as that of the PPT and as good physical properties as those of the PET and PPT.

Ponnusamy and Balakrishnan employ DMT as the starting material to produce PET or PPT. However, DMT itself is not accessible commercially, and the price is typically high. In addition, the methanol by-product must be removed by an additional recovering process, which inevitably increases the production cost. On the other hand, the present invention uses a pure terephthalic acid (PTA) as the starting material. Since the starting material of the present invention is more accessible, the process according to the present invention therefore is more convenient, which reduces the overall production cost.

The pure terephthalic acid (PTA) monomer used in processes (a), (b), (d) and (e) is fiber grade and preferably has the following properties: acid number=675±2, 4CBA (4-carboxybenzaldehyde)≦25 ppm, ash≦15 ppm, metal≦2 ppm, molecular weight=166.13 g/mol, and particle size≦75μ.

The 1,3-propanediol used in processes (a), (b) and (d) preferably has the following properties: purity>99%, water content<2 weight %, molecular weight=76.10 g/mol, the melting point at about −32° C., and the boiling point at about 214° C. (at ambient pressure).

The ethylene glycol used in processes (d) and (e) preferably has the following properties: purity higher than 98.5%, more preferably higher than 99%, water content<2 weight %, more preferably<0.005 weight %, molecular weight= 62.07 g/mol, the melting point at about −13° C., the boiling point at about 197.2° C., ignition point=111.1° C. (in a closed system), and specific gravity=1.1336 (20/20° C.).

In processes (a) and (b), the molar ratio of 1,3-propanediol to pure terephthalic acid is preferably in the range of 1.3 to 2.4.

The bis-2-hydroxyethyl terephthalate (BHET) used in processes (a), (b) and (c) preferably has the following properties: acid number=28±8 KOH mg/g, saponification value=558±20 KOH mg/g, conversion ratio=95±1.5%, and free ethylene glycol≦4%. In addition, the BHET used in the present invention is preferably obtained by reacting ethylene glycol and pure terephthalic acid with a molar ratio of 1.0 to 2.4, more preferably 1.2 to 1.5.

The bis-2-hydroxypropyl terephthalate (BHPT) used in processes (c) and (e) preferably has the following properties: acid number=3.76±0.5 KOH mg/g, saponification value= 506±20 KOH mg/g, conversion ratio=98±1.5%, and free propylene glycol≦0.046%. In addition, the BHPT used in the present invention is preferably obtained by reacting 1,3-propanediol and pure terephthalic acid with a molar ratio of 1.0 to 2.4, more preferably 1.2 to 1.5.

The esterification reaction in processes (a), (b), (d) and (e) is preferably conducted in the presence of an esterification catalyst. Suitable esterification catalyst can be tetraethylene titanate, tetrabutylene titanate, or a mixture thereof, preferably in the amount of 100 to 300 ppm based on the total weight of the pure terephthalic acid.

The copolymerization reaction in processes (a) to (e) is preferably conducted in the presence of a polymerization catalyst such as antimony acetate or antimony trioxide. The polymerization catalyst is preferably present in the amount of 100 ppm to 300 ppm based on the total weight of the pure terephthalic acid. For process (c), the polymerization catalyst is preferably present in the amount of 100 ppm to 300 ppm based on the total weight of the pure terephthalic acid used for preparing BHET and BHPT.

During the copolymerization reaction of the present invention, a cocatalyst can be further added to make the copolymerization undergo more easily. Cocatalysts suitable for use in the present invention include cobalt acetate, manganese acetate, magnesium acetate, calcium acetate, and sodium acetate. The usage amount is preferably 30 ppm to 150 ppm based on the total weight of the pure terephthalic acid. For process (c), the cocatalyst is preferably present in the amount of 30 ppm to 150 ppm based on the total weight of the pure terephthalic acid used for preparing BHET and BHPT. When cobalt acetate is used, the amount is preferably 5 ppm to 50 ppm based on the pure terephthalic acid weight.

During the copolymerization reaction of the present invention, a thermal stabilizer can be further added, such as trivalent phosphate ester or phosphate salt, to improve the thermal stability of the product BHET, BHPT, or PPT/PET copolyester. Pepresentative examples of thermal stabilizers include sodium dihydrogen phosphate and triphenyl phosphate. The amount is preferably 10 ppm to 20 ppm based on the pure terephthalic acid weight.

In processes (a), (b), (d) and (e), the esterification reaction is preferably conducted at a temperature of 200° C. to 255° C., more preferably at a temperature of 220° C. to 250° C. and at a pressure of 1 atm to 3.5 atm. The subsequent prepolymerization reaction is preferably conducted at a temperature of 230° C. to 252° C. and at a vacuum of less than or equal to 30 torr, and more preferably at a temperature of 245° C. to 250° C. and at a vacuum of 760 torr to 4 torr. The subsequent copolymerization reaction is preferably conducted at a temperature of 240° C. to 275° C. and at a vacuum of less than 2.5 torr, and more preferably at a temperature of 240° C. to 270° C. and at a vacuum of less than 1.5 torr.

Basically, PPT/PET copolyesters with different weight ratio of BHPT and BHET can be obtained through any of the processes from (a) to (e) according to the present invention, wherein the IV value ranges from 0.63 to 0.89 dl/g.

According to the present invention, the obtained polypropylene terephthalate/polyethylene terephthalate (PPT/PET) copolyester product in molten form is extruded into filaments and then cut into granules. Then, cut PPT/PET copolyester granules are dried by absolute dry air and tested for various physical properties as follow.

(1) Intrinsic viscosity (IV): measured in accordance with the ASTM Method D4603-91.

(2) Acid value (—COOH amount): measured in accordance with the method of PV-07013.4 Zimmer Eng. Company, Germany.

(3) Melting point: measured by DSC with reference to the JIS Method K7121-1987.

(4) Color: measured in accordance with the ASTM Method E398-90 and E805-93 to determine L and b* values of PPT/PET copolyester granules.

(5) Saponification value: measured in accordance with the method of PV-09009.2 Zimmer Eng. Company, Germany.

(6) Conversion ratio: measured in accordance with the method of PV-07026.4 Zimmer Eng. Company, Germany.

(7) Free ethylene glycol: measured in accordance with the method of PV-07027.3 Zimmer Eng. Company, Germany.

(8) Free 1,3-propanediol: measured in accordance with the method of PV-07027.3 Zimmer Eng. Company, Germany.

In the following examples, it can be found that the PPT/PET copolyester obtained through the present invention has the following properties: intrinsic viscosity (IV) >0.6 dl/g, acid value (—COOH amount)<40 meq/kg, melting point=190° C.–250° C., L*>60, and b*<12.

The following examples are intended to illustrate the process and the advantages of the present invention more fully without limiting its scope, since numerous modifications and variations will be apparent to those skilled in the art.

EXAMPLE 1

In this example, the weight ratio of BHET/BHPT was designed to be 20/80. A reaction vessel was charged with 181.6 g of pure terephthalic acid (PTA) and followed by 166.4 g of 1,3-propanediol (1,3-PDO), in which the molar ratio of the 1,3-PDO and PTA was 2.0. 77.2 g of bis-2-hydroxyethyl terephthalate (BHET) was added first, and then 100 ppm of tetraethylene titanate (based on the total weight of the PTA) as the esterification catalyst was added. The content of the vessel was agitated slowly with a stirrer to assure homogenous mixing of the raw materials and purged with nitrogen having a flow rate of 200 mL/min in order to remove the residual air. The pressure inside the reaction vessel was increased to 2 kg/cm$^2$ as the vessel was purged with nitrogen having a flow rate of 100 mL/min. Subsequently, while being stirred at a rate of 80 rpm, the reaction vessel was heated to 238° C. After 1.42 hours, or when the water amount that was actually generated had reached 96% of the theoretical value, the esterification was terminated.

The pressure was then reduced, and the polymerization catalyst (250 ppm of antimony acetate, based on the total PTA weight) and the polymerization cocatalyst (40 ppm of cobalt acetate, based on the PTA weight) were added with constant stirring at a rate of 80 rpm. The reaction vessel was continuously heated to 254° C. and the pressure was gradually reduced to vacuum in order to induce polymerization. At the prepolymerization stage, the temperature was 230° C. to 252° C. and the vacuum was less or equal to 30 torr. After 2.1 hours, the applied voltage of the stirrer reached the highest point. When the highest voltage had been reached and remained flat for another 0.5 hours, the polymerization was terminated, and the final vacuum was about 0.8 torr. The polypropylene terephthalate/polyethylene terephthalate (PPT/PET) copolyester product in molten form was extruded into filaments and then cut into granules.

Furthermore, the PPT/PET copolyester granules were dried by absolute dry air and tested for various physical properties. The tested results were: IV=0.8239, acid number=17.89 meq/kg, Tm=221.23° C., Tg=49.39° C., L*=82.62, and b*=9.75. Accordingly, the reaction conditions and results are listed as shown in Tables 1, 2 and 3.

EXAMPLE 2

In this example, the weight ratio of BHET/BHPT was designed to be 40/60. A reaction vessel was charged with 136.3 g of pure terephthalic acid (PTA) and followed by 99.87 g of 1,3-propanediol (1,3-PDO), in which the molar ratio of the 1,3-PDO and PTA was 1.6. 154.4 g of bis-2-hydroxyethyl terephthalate (BHET) was added first, and then 100 ppm of tetraethylene titanate (based on the PTA weight) as the esterification catalyst was added. The content of the vessel was agitated slowly with a stirrer to assure homogenous mixing of the raw materials and purged with nitrogen having a flow rate of 200 mL/min in order to remove the residual air. The pressure inside the reaction vessel was increased to 2 kg/cm$^2$ as the vessel was purged with nitrogen having a flow rate of 100 mL/min. Subsequently, while being stirred at a rate of 80 rpm, the reaction vessel was heated to 242° C. After 3.67 hours, or when the water amount that was actually generated had reached 96% of the theoretical value, the esterification was terminated.

The pressure was then reduced, and the polymerization catalyst (250 ppm of antimony acetate, based on the total PTA weight) and the polymerization cocatalyst (40 ppm of cobalt acetate, based on the PTA weight) were added with constant stirring at a rate of 80 rpm. The reaction vessel was continuously heated to 253° C. and the pressure was gradually reduced to vacuum in order to induce polymerization. At the prepolymerization stage, the temperature was 230° C. to 252° C. and the vacuum was less or equal to 30 torr. After 2.08 hours, the applied voltage of the stirrer reached the highest point. When the highest voltage had been reached and remained flat for another 0.5 hours, the polymerization was terminated, and the final vacuum was about 0.95 torr. The polypropylene terephthalate/polyethylene terephthalate (PPT/PET) copolyester product in molten form was extruded into filaments and then cut into granules.

Furthermore, the PPT/PET copolyester granules were dried by absolute dry air and tested for various physical properties. The tested results were: IV=0.7557, acid number=12.42 meq/kg, Tm=190.68° C., Tg=−54.75° C., L*=78.77, and b*=5.45. Accordingly, the reaction conditions and results are listed as shown in Tables 1, 2 and 3.

EXAMPLE 3

In this example, the weight ratio of BHET/BHPT was designed to be 60/40. A reaction vessel was charged with 96.3 g of pure terephthalic acid (PTA) and followed by 88.2 g of 1,3-propanediol (1,3-PDO), in which the molar ratio of the 1,3-PDO and PTA was 2.0. 231.6 g of bis-2-hydroxyethyl terephthalate (BHET) was added first, and then 100 ppm of tetraethylene titanate (based on the PTA weight) as the esterification catalyst was added. The content of the vessel was agitated slowly with a stirrer to assure homogenous mixing of the raw materials and purged with nitrogen having a flow rate of 200 mL/min in order to remove the residual air. The pressure inside the reaction vessel was increased to 2 kg/cm$^2$ as the vessel was purged with nitrogen having a flow rate of 100 mL/min. Subsequently, while being stirred at a rate of 80 rpm, the reaction vessel was heated to 242° C. After 2.37 hours, or when the water amount that was actually generated had reached 96% of the theoretical value, the esterification was terminated.

The pressure was then reduced, and the polymerization catalyst (250 ppm of antimony acetate, based on the total PTA weight) and the polymerization cocatalyst (40 ppm of cobalt acetate, based on the PTA weight) were added with constant stirring at a rate of 80 rpm. The reaction vessel was continuously heated to 256° C. and the pressure was gradually reduced to vacuum in order to induce polymerization. At the prepolymerization stage, the temperature was 230° C. to 252° C. and the vacuum was less or equal to 30 torr. After 2 hours, the applied voltage of the stirrer reached the highest point. When the highest voltage had been reached and remained flat for another 0.5 hours, the polymerization was terminated, and the final vacuum was about 1.1 torr. The polypropylene terephthalate/polyethylene terephthalate (PPT/PET) copolyester product in molten form was extruded into filaments and then cut into granules.

Furthermore, the PPT/PET copolyester granules were dried by absolute dry air and tested for various physical properties. The tested results were: IV=0.7117, acid number=19.76 meq/kg, Tg=55.93° C., L*=83.92, and b*=6.16. Accordingly, the reaction conditions and results are listed as shown in Tables 1, 2 and 3.

EXAMPLE 4

In this example, the weight ratio of BHET/BHPT was designed to be 80/20. A reaction vessel was charged with 45.4 g of pure terephthalic acid (PTA) and followed by 49.94 g of 1,3-propanediol (1,3-PDO), in which the molar ratio of the 1,3-PDO and PTA was 2.4. 308.8 g of bis-2-hydroxyethyl terephthalate (BHET) was added first, and then 100 ppm of tetraethylene titanate (based on the PTA weight) as the esterification catalyst was added. The content of the vessel was agitated slowly with a stirrer to assure homogenous mixing of the raw materials and purged with nitrogen having a flow rate of 200 mL/min in order to remove the residual air. The pressure inside the reaction vessel was increased to 2 kg/cm$^2$ as the vessel was purged with nitrogen having a flow rate of 100 mL/min. Subsequently, while being stirred at a rate of 80 rpm, the reaction vessel was heated to 238° C. After 1.75 hours, or when the water amount that was actually generated had reached 96% of the theoretical value, the esterification was terminated.

The pressure was then reduced, and the polymerization catalyst (195.7 ppm of antimony acetate, based on the total PTA weight) and the polymerization cocatalyst (31.3 ppm of cobalt acetate, based on the PTA weight) were added with constant stirring at a rate of 80 rpm. The reaction vessel was continuously heated to 254° C. and the pressure was gradually reduced to vacuum in order to induce polymerization. At the prepolymerization stage, the temperature was 230° C. to 252° C. and the vacuum was less or equal to 30 torr. After 2 hours, the applied voltage of the stirrer reached the highest point. When the highest voltage had been reached and remained flat for another 0.5 hours, the polymerization was terminated, and the final vacuum was about 1 torr. The polypropylene terephthalate/polyethylene terephthalate (PPT/PET) copolyester product in molten form was extruded into filaments and then cut into granules.

Furthermore, the PPT/PET copolyester granules were dried by absolute dry air and tested for various physical properties. The tested results were: IV=0.6358, acid number=10.10 meq/kg, Tg=68.89° C., L*=85.73, and b*=5.39. Accordingly, the reaction conditions and results are listed as shown in Tables 1, 2 and 3.

EXAMPLE 5

In this example, the weight ratio of BHET/BHPT was designed to be 90/10. A reaction vessel was charged with 22.7 g of pure terephthalic acid (PTA) and followed by 24.97 g of 1,3-propanediol (1,3-PDO), in which the molar ratio of the 1,3-PDO and PTA was 2.4. 347.4 g of bis-2-hydroxyethyl terephthalate (BHET) was added first, and then 100 ppm of tetraethylene titanate (based on the PTA weight) as the esterification catalyst was added. The content of the vessel was agitated slowly with a stirrer to assure homogenous mixing of the raw materials and purged with nitrogen having a flow rate of 200 mL/min in order to remove the residual air. The pressure inside the reaction vessel was increased to 2 kg/cm$^2$ as the vessel was purged with nitrogen having a flow rate of 100 mL/min. Subsequently, while being stirred at a rate of 80 rpm, the reaction vessel was heated to 243° C. After 2.5 hours, or when the water amount that was actually generated had reached 96% of the theoretical value, the esterification was terminated.

The pressure was then reduced, and the polymerization catalyst (250 ppm of antimony acetate, based on the total PTA weight) and the polymerization cocatalyst (40 ppm of cobalt acetate, based on the PTA weight) were added with constant stirring at a rate of 80 rpm. The reaction vessel was continuously heated to 256° C. and the pressure was gradually reduced to vacuum in order to induce polymerization. At the prepolymerization stage, the temperature was 230° C. to 252° C. and the vacuum was less or equal to 30 torr. After 2.2 hours, the applied voltage of the stirrer reached the highest point. When the highest voltage had been reached and remained flat for another 0.5 hours, the polymerization was terminated, and the final vacuum was about 0.78 torr. The polypropylene terephthalate/polyethylene terephthalate (PPT/PET) copolyester product in molten form was extruded into filaments and then cut into granules.

Furthermore, the PPT/PET copolyester granules were dried by absolute dry air and tested for various physical properties. The tested results were: IV=0.6279, acid number=8.45 meq/kg, Tm=221.87° C., Tg=69.65° C., L*=82.16, and b*=3.7. Accordingly, the reaction conditions and results are listed as shown in Tables 1, 2 and 3.

EXAMPLE 6

In this example, the weight ratio of BHET/BHPT was designed to be 95/5. A reaction vessel was charged with 11.4 g of pure terephthalic acid (PTA) and followed by 12.48 g of 1,3-propanediol (1,3-PDO), in which the molar ratio of the 1,3-PDO and PTA was 2.4. 366.7 g of bis-2-hydroxyethyl terephthalate (BHET) was added first, and then 100 ppm of tetraethylene titanate (based on the PTA weight) as the esterification catalyst was added. The content of the vessel was agitated slowly with a stirrer to assure homogenous mixing of the raw materials and purged with nitrogen having a flow rate of 200 mL/min in order to remove the residual air. The pressure inside the reaction vessel was increased to 2 kg/cm$^2$ as the vessel was purged with nitrogen having a flow rate of 100 mL/min. Subsequently, while being stirred at a rate of 80 rpm, the reaction vessel was heated to 243° C. After 0.83 hours, or when the water amount that was actually generated had reached 96% of the theoretical value, the esterification was terminated.

The pressure was then reduced, and the polymerization catalyst (250 ppm of antimony acetate, based on the total PTA weight) and the polymerization cocatalyst (40 ppm of cobalt acetate, based on the PTA weight) were added with constant stirring at a rate of 80 rpm. The reaction vessel was continuously heated to 259° C. and the pressure was gradually reduced to vacuum in order to induce polymerization. At the prepolymerization stage, the temperature was 230° C. to 252° C. and the vacuum was less or equal to 30 torr. After 2 hours, the applied voltage of the stirrer reached the highest point. When the highest voltage had been reached and remained flat for another 0.5 hours, the polymerization was terminated, and the final vacuum was about 1 torr.

The polypropylene terephthalate/polyethylene terephthalate (PPT/PET) copolyester product in molten form was extruded into filaments and then cut into granules.

Furthermore, the PPT/PET copolyester granules were dried by absolute dry air and tested for various physical properties. The tested results were: IV=0.6383, acid number=17.07 meq/kg, Tm=239.37° C., Tg=72.87° C., L*=82.74, and b*=3.83. Accordingly, the reaction conditions and results are listed as shown in Tables 1, 2 and 3.

EXAMPLE 7

In this example, the weight ratio of BHET/BHPT was designed to be 92.5/7.5. A reaction vessel was charged with 22.7 g of pure terephthalic acid (PTA) and followed by 24.91 g of 1,3-propanediol (1,3-PDO), in which the molar ratio of the 1,3-PDO and PTA was 2.4. 357.1 g of bis-2-hydroxyethyl terephthalate (BHET) was added first, and then 100 ppm of tetraethylene titanate (based on the PTA weight) as the esterification catalyst was added. The content of the vessel was agitated slowly with a stirrer to assure homogenous mixing of the raw materials and purged with nitrogen having a flow rate of 200 mL/min in order to remove the residual air. The pressure inside the reaction vessel was increased to 2 kg/cm$^2$ as the vessel was purged with nitrogen having a flow rate of 100 mL/min. Subsequently, while being stirred at a rate of 80 rpm, the reaction vessel was heated to 243° C. After 1.33 hours, or when the water amount that was actually generated had reached 96% of the theoretical value, the esterification was terminated.

The pressure was then reduced, and the polymerization catalyst (250 ppm of antimony acetate, based on the total PTA weight) and the polymerization cocatalyst (40 ppm of cobalt acetate, based on the PTA weight) were added with constant stirring at a rate of 80 rpm. The reaction vessel was continuously heated to 259° C. and the pressure was gradually reduced to vacuum in order to induce polymerization. At the prepolymerization stage, the temperature was 230° C. to 252° C. and the vacuum was less or equal to 30 torr. After 2.08 hours, the applied voltage of the stirrer reached the highest point. When the highest voltage had been reached and remained flat for another 0.5 hours, the polymerization was terminated, and the final vacuum was about 0.95 torr. The polypropylene terephthalate/polyethylene terephthalate (PPT/PET) copolyester product in molten form was extruded into filaments and then cut into granules.

Furthermore, the PPT/PET copolyester granules were dried by absolute dry air and tested for various physical properties. The tested results were: IV=0.6561, acid number=11.05 meq/kg, Tm=230° C., Tg=61° C., L*=84.45, and b*=3.01. Accordingly, the reaction conditions and results are listed as shown in Tables 1, 2 and 3.

EXAMPLE 8

In this example, the weight ratio of BHET/BHPT was designed to be 95/5. A reaction vessel was charged with 11.4 g of pure terephthalic acid (PTA) and followed by 12.5 g of 1,3-propanediol (1,3-PDO), in which the molar ratio of the 1,3-PDO and PTA was 2.4. Then, 100 ppm of tetraethylene titanate (based on the PTA weight) as the esterification catalyst was added. The content of the vessel was agitated slowly with a stirrer to assure homogenous mixing of the raw materials and purged with nitrogen having a flow rate of 200 mL/min in order to remove the residual air. The pressure inside the reaction vessel was increased to 2 kg/cm$^2$ as the vessel was purged with nitrogen having a flow rate of 100 mL/min. Subsequently, while being stirred at a rate of 80 rpm, the reaction vessel was heated to 241° C. After 2.83 hours, or when the water amount that was actually generated had reached 96% of the theoretical value, the esterification was terminated.

The pressure was then reduced, and 366.7 g of BHET, the polymerization catalyst (250 ppm of antimony acetate, based on the total PTA weight) and the polymerization cocatalyst (40 ppm of cobalt acetate, based on the PTA weight) were added with constant stirring at a rate of 80 rpm. The reaction vessel was continuously heated to 258° C. and the pressure was gradually reduced to vacuum in order to induce polymerization. At the prepolymerization stage, the temperature was 230° C. to 252° C. and the vacuum was less or equal to 30 torr. After 2.18 hours, the applied voltage of the stirrer reached the highest point. When the highest voltage had been reached and remained flat for another 0.5 hours, the polymerization was terminated, and the final vacuum was about 1.2 torr.

The polypropylene terephthalate/polyethylene terephthalate (PPT/PET) copolyester product in molten form was extruded into filaments and then cut into granules.

Furthermore, the PPT/PET copolyester granules were dried by absolute dry air and tested for various physical properties. The tested results were: IV=0.6773, acid number=28.16 meq/kg, Tm=244.86° C., Tg=74.32° C., L*=77.96, and b*=7.77. Accordingly, the reaction conditions and results are listed as shown in Tables 1, 2 and 3.

EXAMPLE 9

In this example, the weight ratio of BHET/BHPT was designed to be 95/5. A reaction vessel was charged with 366.7 g of bis-2-hydroxyethyl terephthalate (BHET) and followed by 19.3 g of bis-2-hydroxypropyl terephthalate (BHPT), the polymerization catalyst (250 ppm of antimony acetate, based on the PTA weight), and the polymerization cocatalyst (40 ppm of cobalt acetate, based on PTA weight). (BHET was obtained by reacting PTA with ethylene glycol, and BHPT was obtained by reacting PTA with 1,3-propanediol.) The content of the vessel was then purged with nitrogen having a flow rate of 50 mL/min in order Lo remove the residual air. While being stirred at a rate of 80 rpm, the reaction vessel was continuously heated to 259° C., and the pressure was gradually reduced to vacuum in order to induce polymerization. At the prepolymerization stage, the temperature was 230° C. to 252° C. and the vacuum was less or equal to 30 torr. After 1.45 hours, the applied voltage of the stirrer reached the highest point. When the highest voltage had been reached and remained flat for another 0.5 hours, the polymerization was terminated, and the final vacuum was about 1.05 torr.

The polypropylene terephthalate/polyethylene terephthalate (PPT/PET) copolyester product in molten form was extruded into filaments and then cut into granules.

Furthermore, the PPT/PET copolyester granules were dried by absolute dry air and tested for various physical properties. The tested results were: IV=0.7279, acid number=23.38 meq/kg, Tm=245.17° C., Tg=66.53° C., L*=77.66, and b*=8.5. Accordingly, the reaction conditions and results are listed as shown in Tables 1, 2 and 3.

EXAMPLE 10

In this example, the weight ratio of BHET/BHPT was designed to be 95/5. A reaction vessel was charged with 251 g of pure terephthalic acid (PTA) and followed by 6.24 g of 1,3-propanediol (1,3-PDO), in which the molar ratio of the 1,3-PDO and PTA was 1.2. Then, 107.4 g of ethylene glycol (EG) was added, in which the molar ratio of the EG and PTA was 1.2. Then, the esterification catalyst (100 ppm of tetraethylene titanate, based on the PTA weight) and the polymerization catalyst (250 ppm of antimony trioxide, based on the PTA weight) were added. The contents of the vessel was agitated slowly with a stirrer to assure homogenous mixing of the raw materials and purged with nitrogen having a flow rate of 200 mL/min in order to remove the residual air. The pressure inside the reaction vessel was increased to 3.5 kg/cm$^2$ as the vessel was purged with nitrogen having a flow rate of 100 mL/min. Subsequently, while being stirred at a rate of 80 rpm, the reaction vessel was heated to 240° C. After 7 hours, or when the water amount that was actually generated had reached 96% of the theoretical value, the esterification was terminated.

The pressure was then reduced, and the polymerization cocatalyst (40 ppm of cobalt acetate, based on PTA weight) was added with constant stirring at a rate of 80 rpm. The reaction vessel was continuously heated to 259° C. and the pressure was gradually reduced to vacuum to induce polymerization. At the prepolymerization stage, the temperature was 230° C. to 252° C. and the vacuum was less or equal to 30 torr. After 1.5 hours, the applied voltage of the stirrer reached the highest point. When the highest voltage had been reached and remained flat for another 0.5 hours, the polymerization was terminated, and the final vacuum was about 1.5 torr.

The polypropylene terephthalate/polyethylene terephthalate (PPT/PFT) copolyester product in molten form was extruded into filaments and then cut into granules.

Furthermore, the PPT/PET copolyester granules were dried by absolute dry air and tested for various physical properties. The tested results were: IV=0.6434, acid number=26.03 meq/kg, Tm=241.59° C., Tg=67.53° C., L*=74.03, and b*=5.44. The reaction conditions and results are listed as shown in Tables 1, 2 and 3.

EXAMPLE 11

In this example, the weight ratio of BHET/BHPT was designed to be 95/5 and the molar ratio of EG and PTA was designed to be 1.3. A 200 L esterification vessel was charged with 4.5 kg of BHPT, 55 kg of PTA, 27 kg of EG and 300 ppm of antimony trioxide (based on the PTA weight) as the polymerization catalyst. For the preparation of BHPT, tetrabutylene titanate was used as the esterification catalyst. The content of the vessel was purged with nitrogen having a flow rate of 4 L/min and homogeneously stirred at a stirring rate of 130 rpm and under a reaction pressure of 2 kg/cm$^2$. The interior temperature of the vessel was raised to 255° C. During the esterification process, the byproducts, water and EG, were separated by a separation tower, whereas water was then collected at the top of the tower. After 3.3 hours of esterification, the esterified product was moved to a polymerization vessel.

The esterified product was subjected to prepolymerization and polymerization in the polymerization vessel. The pressure was reduced to a vacuum of 1 torr in 50 minutes. At the prepolymerization stage, the temperature was 230° C. to 252° C. and the vacuum was less or equal to 30 torr. At the polymerization stage, the temperature was 255° C. to 270° C. and the vacuum was 1 torr. During the prepolymerization and polymerization processes, the stirring rate was initially at 60 rpm and eventually slowed down to 30 rpm. The total polymerization time was 3.5 hours.

The polypropylene terephthalate/polyethylene terephthalate (PPT/PET) copolyester product in molten form was extruded into filaments and then cut into granules.

Furthermore, the PPT/PET copolyester granules were dried by absolute dry air and tested for various physical properties. The tested results were: IV=0.6164, acid number=15.96 meq/kg, Tm=239.80° C., Tg=70.54° C., L*=62.88, and b*=8.03. The reaction conditions and results are listed as shown in Tables 1, 2 and 3.

EXAMPLE 12

In this example, the weight ratio of BHET/BHPT was designed to be 80/20, and the molar ratio of EC and PTA was designed to be 1.3. A 200 L esterification vessel was charged with 19.1 kg of BHPT, 50 kg of PTA, 24.3 kg of EC and 300 ppm of antimony trioxide (based on the PTA weight) as the polymerization catalyst. For the preparation of BHPT, tetrabutylene titanate was used as the esterification catalyst. The content of the vessel was purged with nitrogen having a flow rate of 4 L/min and homogeneously stirred at a stirring rate of 130 rpm and under a reaction pressure of 2 kg/cm$^2$. The interior temperature of the vessel was raised to 245° C. During the esterification process, the byproducts, water and EC, were separated by a separation tower, whereas water was then collected at the top of the tower. After 3.5 hours of esterification, the esterified product was moved to a polymerization vessel.

The esterified product was subjected to prepolymerization and polymerization in the polymerization vessel. The pressure was reduced to a vacuum of 1 torr in 50 minutes. At the prepolymerization stage, the temperature was 230° C. to 252° C. and the vacuum was less or equal to 30 torr. At the polymerization stage, the temperature was 245° C. to 255° C. and the vacuum was 1 torr. During the prepolymerization and polymerization processes, the stirring rate was initially at 60 rpm and eventually slowed down to 30 rpm. The total polymerization time was 4 hours.

The polypropylene terephthalate/polyethylene terephthalate (PPT/PET) copolyester product in molten form was extruded into filaments and then cut into granules.

Furthermore, the PPT/PET copolyester granules were dried by absolute dry air and tested for various physical properties. The tested results were: IV=0.6325, acid number=11.26 meq/kg, Tm=201.36° C., Tg=65.59° C., L*=62.88, and b*=10.31. The reaction conditions and results are listed as shown in Tables 1, 2 and 3.

EXAMPLE 13

In this example, the weight ratio of BHET/BHPT was designed to be 84/16, and the molar ratio of EG and PTA was designed to be 1.3. A 200 L esterification vessel was charged with 12 kg of BHPT, 40 kg of PTA, 19.4 kg of EG and 300 ppm of antimony trioxide (based on the PTA weight) as the polymerization catalyst. For the preparation of BHPT, tetrabutylene titanate was used as the esterification catalyst. The content of the vessel was purged with nitrogen having a flow rate of 4 L/min and homogeneously stirred at a stirring rate of 130 rpm and under a reaction pressure of 2 kg/cm$^2$. The interior temperature of the vessel was raised to 250° C. During the esterification process, the byproducts, water and EG, were separated by a separation tower, whereas water was then collected at the top of the tower. After 4 hours of esterification, the esterified product was moved to a polymerization vessel.

The esterified product was subjected to prepolymerization and polymerization in the polymerization vessel. The pressure was reduced to a vacuum of 1 torr in 50 minutes. At the prepolymerization stage, the temperature was 230° C. to 252° C. and the vacuum was less or equal to 30 torr. At the polymerization stage, the temperature was 245° C. to 255° C. and the vacuum was 1 torr. During the prepolymerization and polymerization processes, the stirring rate was initially at 60 rpm and eventually slowed down to 30 rpm. The total polymerization time was 3.3 hours.

The polypropylene terephthalate/polyethylene terephthalate (PPT/PET) copolyester product in molten form was extruded into filaments and then cut into granules.

Furthermore, the PPT/PET copolyester granules were dried by absolute dry air and tested for various physical properties The tested results were: IV=0.6381, acid number= 25.86 meq/kg, Tm=206.26° C., Tg=68.73° C., L*=62.61, and b*=5.62. The reaction conditions and results are listed as shown in Tables 1, 2 and 3.

Comparative Example 1

In this example, the weight ratio of BHET/BHPT was designed to be 40/60. A reaction vessel was charged with 136.3 g of pure terephthalic acid (PTA) and followed by 74.9 g of 1,3-propanediol (1,3-PDO), in which the molar ratio of the 1,3-PDO and PTA was 1.2. 154.4 g of bis-2-hydroxyethyl terephthalate (BHET) was added first, and then 100 ppm of tetraethylene titanate (based on the PTA weight) as the esterification catalyst was added. The content of the vessel was agitated slowly with a stirrer to assure homogenous mixing of the raw materials and purged with nitrogen having a flow rate of 200 mL/min in order to remove the residual air. The pressure inside the reaction vessel was increased to 2 kg/cm$^2$ as the vessel was purged with nitrogen having a flow rate of 100 mL/min. Subsequently, while being stirred at a rate of 80 rpm, the reaction vessel was heated to 244° C. After 7 hours, the esterification was terminated. In comparison, the water amount that was actually generated could only have reached 89%, instead of 96%, of the theoretical value.

The pressure was then reduced, and the polymerization catalyst (250 ppm of antimony acetate, based on the PTA weight) and the polymerization cocatalyst (40 ppm of cobalt acetate, based on PTA weight) were added with constant stirring at a rate of 80 rpm. The reaction vessel was continuously heated to 250° C. and the pressure was gradually reduced to vacuum in order to induce polymerization. At the prepolymerization stage, the temperature was 230° C. to 252° C. and the vacuum was less or equal to 30 torr. After 3.3 hours, the applied voltage of the stirrer reached the highest point. When the highest voltage had been reached and remained flat for another 0.5 hours, the polymerization was terminated, and the final vacuum was about 0.9 torr. The copolymer product in molten form could not be extruded into filaments and the desired polypropylene terephthalate/ polyethylene terephthalate copolyester could not be obtained.

Comparative Example 2

In this example, the weight ratio of BHET/BHPT was designed to be 100/0. A reaction vessel was charged with 386 g of bis-2-hydroxyethyl terephthalate (BHET), 250 ppm of antimony acetate as the polymerization catalyst (based on the PTA weight), and 40 ppm of cobalt acetate as the polymerization cocatalyst (based on the PTA weight). The content of the vessel was purged with nitrogen having a flow rate of 50 mL/min to remove the residual air and then were stirred at a rate of 80 rpm. The reaction vessel was continuously heated to 258° C. and the pressure was gradually reduced to vacuum in order to induce polymerization. At the prepolymerization stage, the temperature was 230° C. to 252° C. and the vacuum was less or equal to 30 torr. After 2.33 hours, the applied voltage of the stirrer reached the highest point. When the highest voltage had been reached and remained flat for another 0.5 hours, the polymerization was terminated, and the final vacuum was about 1 torr.

The polyethylene terephthalate (PET) product in molten form was extruded into filaments and then cut into granules.

Furthermore, the PET granules were dried by absolute dry air and tested for various physical properties. The tested results were: IV=0.6383, acid number=22.61 meq/kg, Tm=256.29° C., Tg=76.03° C., L*=78.73, and b*=2.15. The reaction conditions and results are listed as shown in Tables 1, 2 and 3.

TABLE 1

Esterification Conditions for Preparing PPT/PET Copolyesters

| Example | BHET/BHPT (weight ratio) | BHET (g) | BHPT (g) | PTA (g) | 1,3-PDO (g) | EG | 1,3PDO/PTA (molar ratio) | Ti(OC$_4$H$_9$)$_4$ (ppm) | Sb$_2$O$_3$ (ppm) | P (kg/cm$^2$G) | N$_2$ (ml/min) | Interior Temp (° C.) | t$_E$(hr) |
|---|---|---|---|---|---|---|---|---|---|---|---|---|---|
| 1 | 20/80 | 77.2 | — | 181.6 | 166.4 | — | 2 | 100 | — | 2 | 100 | 235–242 | 1.42 |
| 2 | 40/60 | 154.4 | — | 136.3 | 99.87 | — | 1.6 | 100 | — | 2 | 100 | 241–244 | 3.67 |
| 3 | 60/40 | 231.6 | — | 96.3 | 88.2 | — | 2 | 100 | — | 2 | 100 | 241–242 | 2.37 |
| 4 | 80/20 | 308.8 | — | 45.4 | 49.94 | — | 2.4 | 100 | — | 2 | 100 | 241–243 | 2 |
| 5 | 90/10 | 347.4 | — | 22.7 | 24.97 | — | 2.4 | 100 | — | 2 | 100 | 242–243 | 2.5 |
| 6 | 95/5 | 366.7 | — | 11.4 | 12.48 | — | 2.4 | 100 | — | 2 | 100 | 242–243 | 0.83 |
| 7 | 92.5/7.5 | 357.05 | — | 22.7 | 24.97 | — | 2.4 | 100 | — | 2 | 100 | 242–243 | 1.33 |
| 8 | 95/5 | 366.7 | — | 11.4 | 12.5 | — | 2.4 | 100 | — | 2 | 100 | 240–241 | 2.83 |
| 9 | 95/5 | 366.7 | 193 | — | — | — | — | — | — | — | — | — | — |
| 10 | 95/5 | — | — | 251 | 6.24 | 107.41 | 1.2 | 100 | — | 3.5 | 100 | 239–241 | 7 |
| 11 | 95/5 | — | 4.5 kg | 55 kg | — | 27 kg | — | — | 300 | 2 | 4L/min | 200~255 | 3.3 |
| 12 | 80/20 | — | 19.1 kg | 50 kg | — | 24.3 kg | — | — | 300 | 2 | 4L/min | 200~245 | 3.5 |
| 13 | 84/16 | — | 12.1 kg | 40 kg | — | 19.4 kg | — | — | 300 | 2 | 4L/min | 200~250 | 4 |
| Comp. 1 | 40/60 | 154.4 | — | 136.3 | 74.9 | — | 1.2 | 100 | — | 2 | 100 | 243–245 | 7 |

TABLE 1-continued

Esterification Conditions for Preparing PPT/PET Copolyesters

| Example | BHET/BHPT (weight ratio) | BHET (g) | BHPT (g) | PTA (g) | 1,3-PDO (g) | EG | 1,3PDO/PTA (molar ratio) | Ti(OC$_4$H$_9$)$_4$ (ppm) | Sb$_2$O$_3$ (ppm) | P (kg/cm$^2$G) | N$_2$ (ml/min) | Interior Temp (° C.) | t$_E$(hr) |
|---|---|---|---|---|---|---|---|---|---|---|---|---|---|
| Comp. 2 | 100/0 | 386 | — | — | — | — | — | — | — | — | — | — | — |

Note:
1. Examples 1–7 employ process (a), Example 8 employs process (b), Example 9 employs process (c), Example 10 employs process (d), and Examples 11–13 employ process (e).
2. P indicates nitrogen pressure
3. tetraethylene titanate is an esterification catalyst for example 1–10 and comparative example 1.
4. tetrabutylene titanate is an esterification catalyst for example 11–13.
5. t$_E$ indicates esterification time
6. Comparative example 1 employs process (a)
7. Comparative example 2 uses BHET directly to be polymerized into PET

TABLE 2

The polymerization Conditions for Preparing PPT/PET Copolyesters

| Example | Sb(OAc)$_3$ (ppm) | Co(OAc)$_2$ (ppm) | Interior Temperature (° C.) | The Lowest Vacuum (torr) | T$_p$ (hr) | Stirring Rate (rpm) |
|---|---|---|---|---|---|---|
| 1 | 250 | 40 | 251–258 | 0.8 | 2.1 | 80–72 |
| 2 | 250 | 40 | 250–255 | 0.95 | 2.08 | 80–71 |
| 3 | 250 | 40 | 254–259 | 1.1 | 2 | 80–70 |
| 4 | 250 | 40 | 257–259 | 0.85 | 2 | 80–68–66 |
| 5 | 250 | 40 | 254–258 | 0.78 | 2.2 | 80–65 |
| 6 | 250 | 40 | 258–260 | 1 | 2 | 80–63 |
| 7 | 250 | 40 | 257–261 | 0.95 | 2.08 | 80–63 |
| 8 | 250 | 40 | 257–260 | 1.2 | 2.18 | 80–62 |
| 9 | 250 | 40 | 257–260 | 1.05 | 1.45 | 79–60 |
| 10 | @250 | 40 | 257–261 | 0.9 | 1.5 | 79–60 |
| 11 | — | — | 255–270 | 0.5 | 3.5 | 60–30 |
| 12 | — | — | 245–255 | 0.7 | 4.0 | 60–30 |
| 13 | — | — | 245–255 | 0.9 | 3.3 | 60–30 |
| Comp. 1 | 250 | 40 | 250 | 0.9 | 3.33 | — |
| Comp. 2 | 250 | 40 | 256–259 | 1 | 2.33 | 80–63 |

Note:
1. T$_p$ indicates the total polymerization time from low vacuum to high vacuum.
2. After esterification is complete, the contents are continuously stirred and the polymerization catalyst is added.
3. Examples 1–7 use BHET from Hualon Corporation.
4. Examples 8 and 9 use BHET from Nan Ya Plastics Corporation.
5. @ At the esterification stage, not only the Ti catalyst is added, 250 ppm of Sb$_2$O$_3$ catalyst is also added. At the polymerization stage, only cobalt acetate (cocatalyst)is added.

TABLE 3

The Physical Properties of the PPT/PBT Copolyesters

| Example | IV | —COOH | Tm(° C.) | Tg(° C.) | L* | b* |
|---|---|---|---|---|---|---|
| 1 | 0.8239 | 17.89 | 221.34 | 49.39 | 82.62 | 9.75 |
| 2 | 0.7557 | 12.42 | 190.68 | 54.75 | 78.77 | 5.45 |
| 3 | 0.7117 | 19.76 | — | 55.93 | 83.92 | 6.16 |
| 4 | 0.6358 | 10.10 | — | 68.89 | 85.73 | 5.39 |
| 5 | 0.6279 | 8.45 | 221.87 | 69.65 | 82.16 | 3.70 |
| 6 | 0.6383 | 17.07 | 239.37 | 72.87 | 82.74 | 3.83 |
| 7 | 0.6561 | 11.05 | 230 | 61 | 84.45 | 3.01 |
| 8 | 0.6773 | 28.16 | 244.86 | 74.32 | 77.96 | 7.77 |
| 9 | 0.7279 | 23.38 | 245.17 | 66.53 | 77.66 | 8.5 |
| 10 | 0.6434 | 26.03 | 241.59 | 67.53 | 74.03 | 5.44 |
| 11 | 0.6164 | 15.96 | 239.80 | 70.54 | 62.88 | 8.03 |
| 12 | 0.6325 | 11.26 | 201.36 | 65.59 | 58.58 | 10.31 |
| 13 | 0.6381 | 25.68 | 206.26 | 68.73 | 62.61 | 5.62 |
| Comp.1 | — | — | — | — | — | — |
| Comp.2 | 0.6383 | 22.61 | 256.29 | 76.03 | 78.73 | 2.15 |

From the above results, it can be seen that by employing anyone of the five processes of the present invention, the PPT/PET copolyester with the following properties can be obtained: intrinsic viscosity (IV)>0.6 dl/g, acid value (—COOH amount)<40 meq/kg, melting point=190° C.,–250° C. L*>60, and b*<12. In addition, in order to meet the requirements of a suitable synthetic fiber material, the obtained PPT/PET copolyester preferably should have the following advantages of a PPT material: easy to be dyed, with high elastic resilience, and preferably has a melting point and glass transition temperature higher than those of the PPT material. Therefore, the BHET/BHPT weight ratio is preferably controlled to between 92.5/7.5 and 95/5.

In summary, the feature and advantage of the present invention are as follow:

(1) According to the present invention, an economical amount of 1,3-propanediol of high price can be blended by a conventional commercial PET process to react with PTA; thereby, PPT/PET copolyester can be obtained.

(2) According to the present invention, inexpensive ethylene glycol can replace the high price 1,3-propanediol and can be blended by a recently commercialized PPT process to react with PTA; thereby, PPT/PET copolyester can be obtained.

(3) According to the present invention, BHET, which is over-produced by the conventional commercial PET process, can be used to react with PTA and 1,3-propanediol in polymerization reaction, such that the PPT/PET copolyester can be rapidly obtained.

(4) According to the present invention, BHPT which is produced too much in the recently commerciallized PPT process can be used to react with PTA and ethylene glycol by polymerization reaction, whereby the PPT/PET copolyester can be rapidly obtained.

(5) The present invention can produce a PPT/PET copolyester having the physical properties of PPT and PET, whereas the PPT/PET copolyester obtained has the following properties: intrinsic viscosity (IV)>0.6 dl/g, acid value (—COOH amount)<40 meq/kg, melting point=190° C.–250° C., L*>60, and b*<12. In addition, a preferred PPT/PET copolyester has a BHPT chain of 5 weight % to 7.5 weight % based on the total weight of BHPT and BHET.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for preparing polypropylene terephthalate/polyethylene terephthalate (PPT/PET) copolyester, comprising a process selected from the group consisting of process (a) to process (e), wherein process (a) comprises subjecting bis-2-hydroxyethyl terephthalate (BHET), pure terephthalic acid (PTA) and 1,3-propanediol (1,3-PDO) to undergo an esterification reaction to produce BHET and bis-2-hydroxypropyl terephthalate (BHPT), and then subjecting BHET and BHPT to undergo a copolymerization reaction;

process (b) comprises subjecting PTA and 1,3-PDO to undergo an esterification reaction to produce BHPT, adding BHET, and then subjecting BHET and BHPT to undergo a copolymerization reaction;

process (c) comprises subjecting BHET and BHPT to undergo a copolymerization reaction;

process (d) comprises subjecting PTA, ethylene glycol (EG) and 1,3-PDO to undergo an esterification reaction to produce BHET and BHPT, and then subjecting BHET and BHPT to undergo a copolymerization reaction; and process (e) comprises subjecting BHPT, PTA and EG to undergo an esterification reaction to produce BHPT and BHET, and then subjecting BHET and BHPT to undergo a copolymerization reaction.

2. The method as claimed in claim 1, wherein the pure terephthalic acid monomer used in processes (a), (b), (d) and (e) is fiber grade and has the following properties: acid number=675±2, 4CBA (4-carboxybenzaldehyde)≦25 ppm, ash≦15 ppm, metal<2 ppm, molecular weight=166.13 g/mol, and particle size≦75μ.

3. The method as claimed in claim 1, wherein the 1,3-propanediol used in processes (a), (b) and (d) has the following properties: purity>99% and water content<2 weight %.

4. The method as claimed in claim 1, wherein the ethylene glycol used in processes (d) and (e) has the following properties: purity>99% and water content<2 weight %.

5. The method as claimed in claim 1, wherein in processes (a) and (b), the molar ratio of 1,3-propanediol to pure terephthalic acid is in the range of 1.3 to 2.4.

6. The method as claimed in claim 1, wherein the bis-2-hydroxyethyl terephthalate (BHET) used in processes (a), (b) and (c) has the following properties: acid number=28±8 KOH mg/g, saponification value=558±20 KOH mg/g, conversion ratio=95±1.5%, and free ethylene glycol≦4%.

7. The method as claimed in claim 1, wherein the bis-2-hydroxypropyl terephthalate (BHPT) used in processes (c) and (e) has the following properties: acid number=3.76±0.5 KOH mg/g, saponification value=506±20 KOH mg/g, conversion ratio=98±1.5%, and free propylene glycol≦0.046%.

8. The method as claimed in claim 1, wherein the esterification reaction in processes (a), (b), (d) and (e) is conducted in the presence of an esterification catalyst selected from the group consisting of tetraethylene titanate, tetrabutylene titanate, and a mixture thereof in an amount of 100 to 300 ppm based on the weight of pure terephthalic acid.

9. The method as claimed in claim 1, wherein the copolymerization reaction in processes (a) to (e) is conducted in the presence of a polymerization catalyst selected from the group consisting of antimony acetate and antimony trioxide.

10. The method as claimed in claim 9, wherein in processes (a), (b), (d) and (e), the polymerization catalyst is present in an amount of 100 ppm to 300 ppm based on the weight of pure terephthalic acid.

11. The method as claimed in claim 10, wherein in processes (a), (b), (d) and (e), the copolymerization reaction is conducted in the presence of a cocatalyst selected from the group consisting of cobalt acetate, manganese acetate, magnesium acetate, calcium acetate, and sodium acetate.

12. The method as claimed in claim 11, wherein the cocatalyst is present in an amount of 30 ppm to 150 ppm based on the weight of pure terephthalic acid.

13. The method as claimed in claim 9, wherein in process (c), the BHET is obtained from reacting pure terephthalic acid and ethylene glycol, and the BHPT is obtained from reacting pure terephthalic acid and 1,3-propanediol.

14. The method as claimed in claim 13, wherein the polymerization catalyst is present in an amount of 100 ppm to 300 ppm based on the weight of pure terephthalic acid.

15. The method as claimed in claim 14, wherein in process (c), the copolymerization reaction is conducted in the presence of a cocatalyst selected from the group consisting of cobalt acetate, manganese acetate, magnesium acetate, calcium acetate, and sodium acetate.

16. The method as claimed in claim 15, wherein the cocatalyst is present in an amount of 30 ppm to 150 ppm based on the weight of pure terephthalic acid.

17. The method as claimed in claim 1, wherein in processes (a), (b), (d) and (e), the esterification reaction is conducted at a temperature of 200° C. to 255° C. and at a pressure of 1 atm to 3.5 atm.

18. The method as claimed in claim 1, wherein in processes (a) to (e), the copolymerization reaction is conducted at a temperature of 240° C. to 275° C. and at a vacuum of less than 2.5 torr.

19. The method as claimed in claim 1, wherein the obtained PPT/PET copolyester has the following properties: intrinsic viscosity (IV)>0.6 dl/g, acid value (—COOH amount)<40 meq/kg, melting point=190° C.–250° C., L*>60, and b*<12.

20. The method as claimed in claim 1, wherein the BHPT used in processes (a) to (a) is present in an amount of 5 weight % to 7.5 weight % based on the total weight of BHPT and BHET.

21. A method for preparing polypropylene terephthalate/polyethylene terephthalate (PPT/PET) copolyester, comprising a process selected from the group consisting of process (a) to process (e), wherein process (a) comprises subjecting bis-2-hydroxyethyl terephthalate (BHET), pure terephthalic acid (PTA) and 1,3-propanediol (1,3-PDO) to undergo an esterification reaction to produce BHET and bis-2-hydroxypropyl terephthalate (BHPT), and then subjecting BHET and BHPT to undergo a copolymerization reaction;

process (b) comprises subjecting PTA and 1,3-PDO to undergo an esterification reaction to produce BHPT, adding BHET, and then subjecting BHET and BHPT to undergo a copolymerization reaction;

process (c) comprises subjecting BHET and BHPT to undergo a copolymerization reaction;

process (d) comprises subjecting PTA, ethylene glycol (EG) and 1,3-PDO to undergo an esterification reaction to produce BHET and BHPT, and then subjecting BHET and BHPT to undergo a copolymerization reaction; and process (e) comprises subjecting BHPT, PTA and EG to undergo an esterification reaction to produce BHPT and BHET, and then subject BHET and BHPT to undergo a copolymerization reaction;

wherein in processes (a) and (b), the molar ratio of 1,3-propanediol to pure terephthalic acid is in the range of 1.3 to 2.4;

wherein the esterification reaction in processes (a), (b), (d) and (e) is conducted in the presence of an esterification catalyst selected from the group consisting of tetraethylene titanate, tetrabutylene titanate, and a mixture thereof in an amount of 100 to 300 ppm based on the weight of pure terephthalic acid;

wherein the copolymerization reaction in processes (a) to (e) is conducted in the presence of a polymerization catalyst selected from the group consisting of antimony acetate and antimony trioxide;

wherein in processes (a), (b), (d) and (e), the polymerization catalyst is present in an amount of 100 ppm to 300 ppm based on the weight of pure terephthalic acid;

wherein in processes (a), (b), (d) and (e), the esterification reaction is conducted at a temperature of 200° C. to 255° C. and at a pressure of I atm to 3.5 atm; and wherein in processes (a) to (e), the copolymerization reaction is conducted at a temperature of 240° C. to 275° C. and at a vacuum of less than 2.5 torr.

* * * * *